United States Patent
Feldman et al.

(10) Patent No.: US 7,908,504 B2
(45) Date of Patent: Mar. 15, 2011

(54) SMART BATTERYLESS BACKUP DEVICE AND METHOD THEREFOR

(76) Inventors: Michael Feldman, Thornhill (CA); Alexander Feldman, Maple (CA); Boris Feldman, Thornhill (CA)

( * ) Notice: Subject to any disclaimer, the term of this patent is extended or adjusted under 35 U.S.C. 154(b) by 998 days.

(21) Appl. No.: 11/726,751

(22) Filed: Mar. 23, 2007

(65) Prior Publication Data
US 2008/0235471 A1    Sep. 25, 2008

(51) Int. Cl.
*G06F 1/00* (2006.01)
*G06F 11/30* (2006.01)

(52) U.S. Cl. ............ 713/340; 713/300; 714/15; 714/22; 711/100; 711/162

(58) Field of Classification Search .......... 713/300, 713/340; 714/15, 22; 711/100, 162
See application file for complete search history.

(56) References Cited

U.S. PATENT DOCUMENTS

| | | | | |
|---|---|---|---|---|
| 4,965,828 A | * | 10/1990 | Ergott et al. | 713/193 |
| 5,799,200 A | * | 8/1998 | Brant et al. | 713/340 |
| 6,470,063 B2 | * | 10/2002 | Liew | 377/2 |
| 6,496,939 B2 | * | 12/2002 | Portman et al. | 713/340 |
| 7,269,755 B2 | * | 9/2007 | Moshayedi et al. | 714/2 |
| 7,613,674 B2 | * | 11/2009 | Uchikado et al. | 706/50 |
| 7,634,688 B2 | * | 12/2009 | Madter et al. | 714/24 |
| 7,661,002 B2 | * | 2/2010 | Pecone et al. | 713/300 |
| 2002/0126793 A1 | * | 9/2002 | Liew | 377/37 |
| 2004/0030852 A1 | * | 2/2004 | Coombs et al. | 711/162 |
| 2005/0138311 A1 | * | 6/2005 | Ko | 711/162 |
| 2006/0080515 A1 | * | 4/2006 | Spiers et al. | 711/162 |
| 2007/0033432 A1 | * | 2/2007 | Pecone et al. | 714/6 |
| 2007/0195613 A1 | * | 8/2007 | Rajan et al. | 365/189.05 |
| 2007/0256096 A1 | * | 11/2007 | Wilhelm | 725/34 |
| 2007/0266212 A1 | * | 11/2007 | Uchikado et al. | 711/162 |

* cited by examiner

*Primary Examiner* — Thomas Lee
*Assistant Examiner* — Jaweed A Abbaszadeh

(57) ABSTRACT

A proposed smart batteryless backup device is designed for the reception of data transmitted by controlled equipment, backing up said data in the case of the controlled equipment power failure or in accordance with several program requirements, and also for the subsequent restoration. Proposed device improves trust level of the backup if device is powered by interface signal lines and doesn't have batteries and electrical characteristics of the backup device fluctuating due to humidity and temperature influences as well as during device lifetime.

19 Claims, 7 Drawing Sheets

SMART BATTERYLESS BACKUP DEVICE AND METHOD THEREFOR

CROSS-REFERENCE TO RELATED APPLICATIONS

This is the first application filed for the present invention.

TECHNICAL FIELD

The present invention relates to smart batteryless backup devices using volatile and non-volatile memories.

BACKGROUND OF THE INVENTION

One of the most important problems that appear during operation of any electronic systems is possibility to store log messages (LOG) and back them up in the case of power loss (further "power down event"). These log messages can help to investigate the reason why the electronic system failure happened and help avoid future failure conditions.

Many systems include storage devices like hard drives, flash cards etc. These devices can store log information during electronic system operation and store this information in the case of a power failure. But some embedded system like "set-up boxes" that are very critical to the cost, to the mechanical size and designed to work stand-alone without human supervision do not have hard drives or writable flash to store log information. In these systems log information is usually located in SRAM during its operation and can not be restored after a power failure. This problem for the embedded systems can be solved by using an additional electronic device that carries out the backup function. In case that power of the main apparatus fails, the backup device stores all LOG information in the internal non-volatile memory by using its internal power source.

The batteries and the capacitors are used in backup devices as the internal power source. Difficulties using batteries are widely known, but also capacitors (and especially super capacitors) that have replaced batteries are not free from shortcomings. Their electrical characteristics can vary under the influence of external factors: humidity and temperatures as well as during lifetime. This leads to the fact that the value of the accumulated charge will be uncertain, especially, if a charge time is limited. The charge time depends on the capacitance of the capacitor and on the diverted current of the external power source. In most cases backup devices use the main power source of the embedded system. But in case when backup device is made as an external device the interface between embedded system (like RS232 serial interface) and backup device is used as the external power source for the backup device. In the case of RS232, the interface has no dedicated power lines and the problem of accumulating charge becomes very important.

Backup devices use accumulated charge for saving LOG information in non-volatile memory. The value of accumulated charge defines the size of the backup information that can be written.

None of the known backup devices can backup LOG information in case the value of accumulated charge is unpredictable. Because existing backup devices may not complete the backup process, therefore the restore process after this will also be unpredictable. It is very important for the backup system to have the information about the exact size of the LOG information that was backed up.

There are many patents concerning the backup process, but none of them solve the previously discussed problem.

Some of the proposals are described in the US Pat. App. 20050283648 by Ashore [1], in the US Pat. App. 20060015683 by Ashore [2], in the US Pat. App. 20060080515 by Spiers et al. [3] etc.

In US Pat Appl. 20050283648 Ashmore offers a back-up RAID controller using the back-up battery of the reserve power supply that is coupled to main power source for charging.

In following US Pat Appl. 20060015683 Ashmore describes a write-caching redundant array of disks (RAID) and offers advantage back-up RAID controller that includes main CPU and additional faster memory controller that is capable of performing the flush operation of the write-posted data. The memory controller is coupled to the volatile memory and the non-volatile memory. This RAID controller uses the main power source and a secondary power source, for example, a capacitor charged by main power source. In the case if the power source fails the CPU is excluded from receiving main power supply, the memory controller performs necessary operations and the secondary power source, for example, capacitor is used only for providing power to the memory controller and two memories.

Several Patent Applications offered by J. Dorny US Pat. Appl. 20040073388 [4], 20050144356 [5] and 20050149663 [6] describe a logger and a method for its use. Computerized method for data loggers according to last Application U.S. Pat. 20050149663 offers a method for estimating the remaining energy capacity of a battery while the battery is powering a digital processor system. The offered method comprises: selecting a predetermined battery consumption characteristics for a particular processor activity.

Spiers et al. [3] US Pat. Appl. 20060080515 proposes a data storage system including a primary data storage device and a backup data storage device. It proposes a data storage system including a primary data storage device and a backup data storage device. The backup data storage device includes a power source, for example, capacitor, battery, or any suitable power source. Said storage system uses a overwriting of the data from volatile memory to non-volatile memory. But the problem related to the value of accumulated charge is nowhere considered.

Present invention focuses on solving the problem related to guarantied backup information in backup devices with an unpredictable value of accumulated charge.

BRIEF SUMMARY OF INVENTION

The present invention provides a smart batteryless backup device that uses capacitors rather than batteries to supply power in the event of a loss of main power and has means for intelligent backup controlling.

The first aspect of the present invention is an opportunity to use simple, cheap and widespread interfaces between backup device and external system, including interfaces that don't have dedicated power supply lines like the serial interface RS-232.

The second aspect consists of using an internal capacitor as the power source for the backup operation that increases the lifetime of the device, allows maintenance-free operating and makes this device suitable to be used for controlling various remote apparatus.

The third aspect of the present invention consists of the fact that the components of the backup device are specifically chosen so that this device records the size of the correctly stored backup information that makes the backup device independent from the value of accumulated charge of the internal capacitor.

The forth aspect of the present invention is the capability to completely restore copied information regardless of when the copied process was interrupted and guarantee it.

The fifth aspect consists in that the proposed device introduces additional operations that enhance the possibility of external apparatus diagnostics.

The sixth aspect of the present invention consists of the fact that the backup operation can be controlled by a special set of commands that allow the memory's size to be reduced, and therefore reduce the capacitance and charge time of the internal capacitor.

At last, the points mentioned above allow for the creation of simple and cheap devices having practically unlimited lifetime, suitable for use in remote systems and maintenance free.

DETAILED DESCRIPTION OF THE PREFERRED EMBODIMENT

Figure 1:
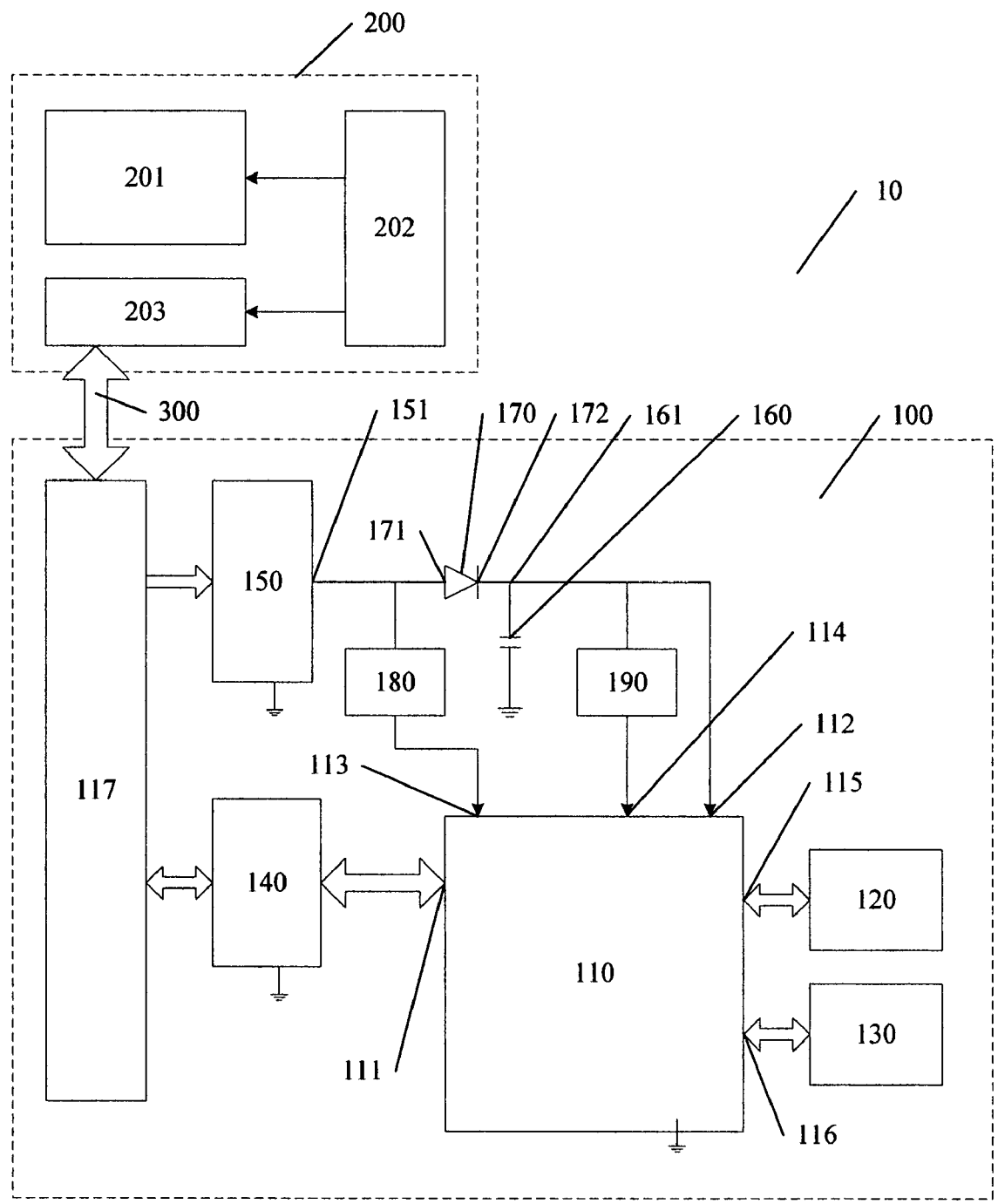
FIG. 1 is a block diagram illustrating a smart batteryless backup device according to the present invention.

Referring now to FIG. 1, a block diagram illustrating a smart batteryless backup device (further "backup device") 100 according to the present invention is shown. This backup device is shown as a part of a computerized system 10. The computerized system 10 comprises the backup device 100, an external computerized apparatus 200 and an external interface bus 300 that is coupled said backup device 100 to the apparatus 200 via an external interface port 117. The external computerized apparatus 200 comprises of a central block 201, for example, a processor, a main power source 202, and an interface port 203 to which said external interface 300 is connected.

The backup device 100 includes a control block 110 based, for example, on the base of a microcontroller (it is not shown). This control block 110 controls all operation of the backup device 100. The control block 110 includes a counter that is inside each microcontroller (it isn't shown).

The control block 110 includes a power supply input 112, control inputs 113 and 114, an internal interface port 111 and interface ports 115 and 116. The interface port 115 is used for connecting a volatile random access memory block (VMB) 120 to said control block 110, and the interface port 116 is used for connection a non-volatile memory block (NVMB) 130 to said control block 110.

The information from said external computerized apparatus 200 goes via said external interface 300, said external interface port 117, an interface conversion block 140 and the control block 110 to said volatile memory block (VMB) 120.

The interface conversion block 140 connects the external interface port 117 and said control block 110 via the internal interface port 111. Said interface conversion block 140 transforms the external interface 300 to the incoming interface of the control block 110. For example, in case that the external interface 300 is RS232 serial interface and said incoming interface of the control block 110 is the same serial interface but operates only with TTL level of signals, the interface conversion block 140 makes just voltage conversion between the two interfaces.

The volatile memory block (VMB) 120 is configured as the cycled buffer and is controlled by the control block 110. The write operation to the volatile memory block (VMB) 120 can only take place until a loss of a voltage across said external interface 300 happened ("power failure event") or a corresponding instruction will be received from the external interface 300 (it's named as "stop").

The present invention uses two arrays of non-volatile memory cells, correspondently "a data array of non-volatile memory cells (DNVM)" and "a parameter array of non-volatile memory cells (PNVM)". The data array of non-volatile memory cells is intended for storing data (messages) that were transferred from the volatile memory block 120 after occurrence of "power failure event" or said instruction "stop".

The non-volatile memory block 130 is coupled to the interface port 116 of said control block 110. The data array of non-volatile memory cells (DNVM) is implemented inside of the non-volatile memory block (NVMB) 130.

The parameter array of non-volatile memory cells (PNVM) is intended for holding supplemental information (it is named as "parameter" array) about the data stored in the data array of non-volatile memory cells (DNVM). In simple case said parameter includes at least a size (N) of the data that are written in the data array of non-volatile memory cells (DNVM). The determination of value N is executed by said counter that is implemented inside the control block 110. In advance case said parameter can include additional information about power failure event, for example, a datum, time, etc. Said parameter array of non-volatile memory cells (PNVM) can be implemented in control block 110 (for example inside microcontroller) or inside of the non-volatile memory block (NVMB) 130.

The backup device 100 includes a power conversion block 150, an electricity accumulating block, and an element of an unidirectional conductivity. Given embodiment of said backup device 110 comprises said accumulating block made in the form of one capacitor 160 and said element of unidirectional conductivity made in the form a diode 170.

The input of the power conversion block 150 is connected to one or more lines of the external interface 300 via an external interface port 117. The output 151 of the power conversion block 150 is connected to a first terminal 171 of the diode 170, a second terminal 172 of said diode is coupled to an ungrounded terminal 161 of the capacitor 160 and an input 112 of the control block 110. The power conversion block 150 and the diode 170 is a charging circuit for the capacitor 160 that supplies power to the control block 110.

The main power source 202 supplies power to said apparatus 200, said external interface bus 300, and said backup device 100 that don't have their own power source. In case of RS232 interface, the lines RTS and DTR are used by the power conversion block 150 for charging the capacitor 160.

The backup device 100 comprises means for "power failure event" detecting, for example, a first voltage detectors 180, and means for backup controlling, for example, a second voltage detector 190 for monitoring voltages across this power conversion block 150 and said capacitor 160 correspondently.

An input of the first voltage detector 180 is connected to the output 151 of the power conversion block 150 and checks the power conversion block output voltage Vout. The output of the first voltage detector 180 is connected to the first control input 113 of the control block 110. This voltage detector 180 determines the power conversion block voltage falling below Vdown corresponding to said case "power failure event". Vdown is the first predetermined threshold. This happens when power from the external interface 300 fails or when the external interface losses connection or operates improperly.

An input of the second voltage detector 190 is coupled to the ungrounded terminal 161 of the capacitor 160. The second voltage detector 190 output is coupled to the control input 114 of the control block 110. The second voltage detector determines the voltage dropping across the capacitor 160 below a second predetermined value VminDNVM+$\Delta$V, where $\Delta$V$\geq$0 and VminDNVM is the minimum operational voltage of DNVM.

Figure 2A:
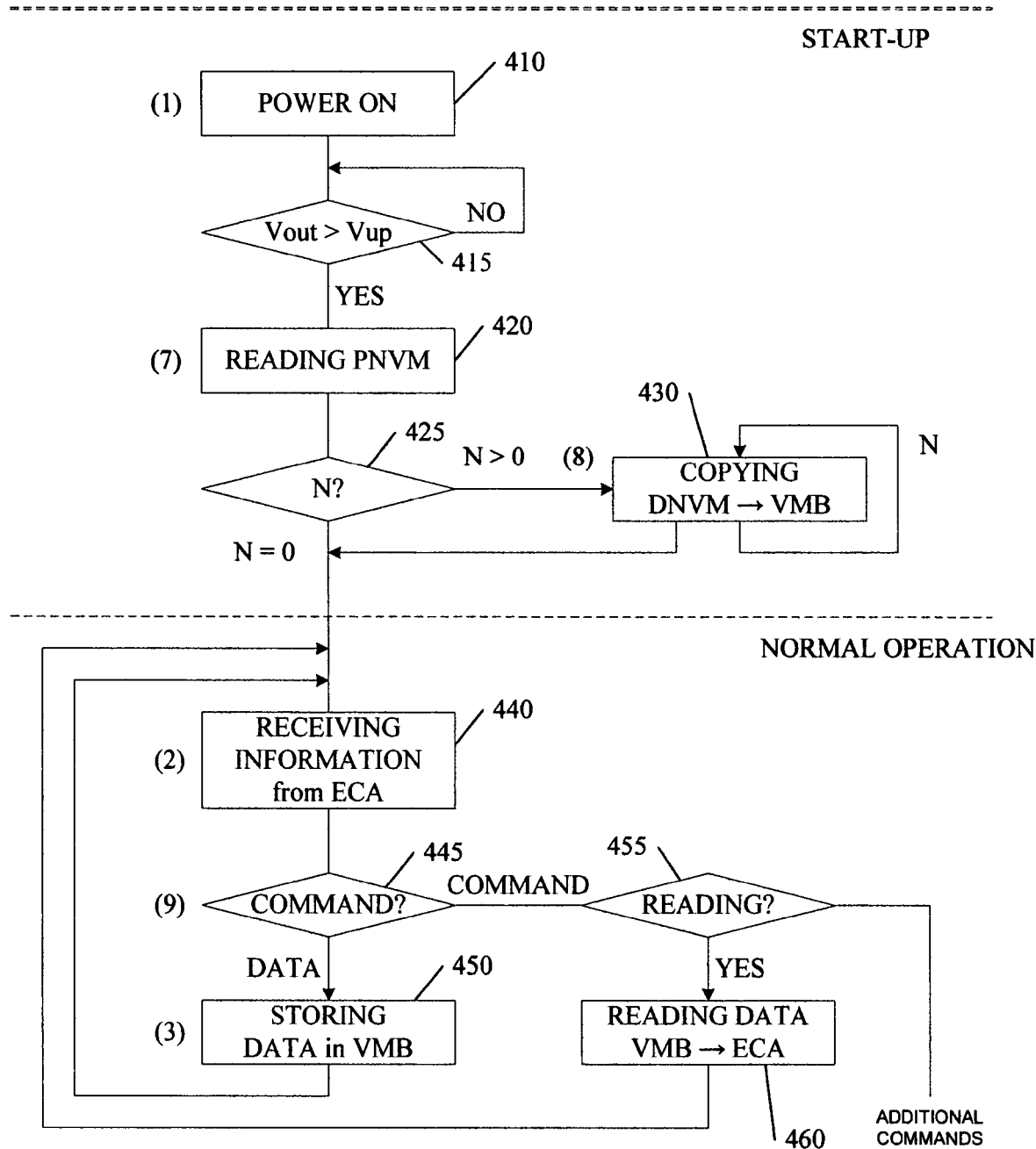
FIGS. 2a and 2b are a main part of the flowchart illustrating an operation of the device (FIG. 1).
Figure 2B:
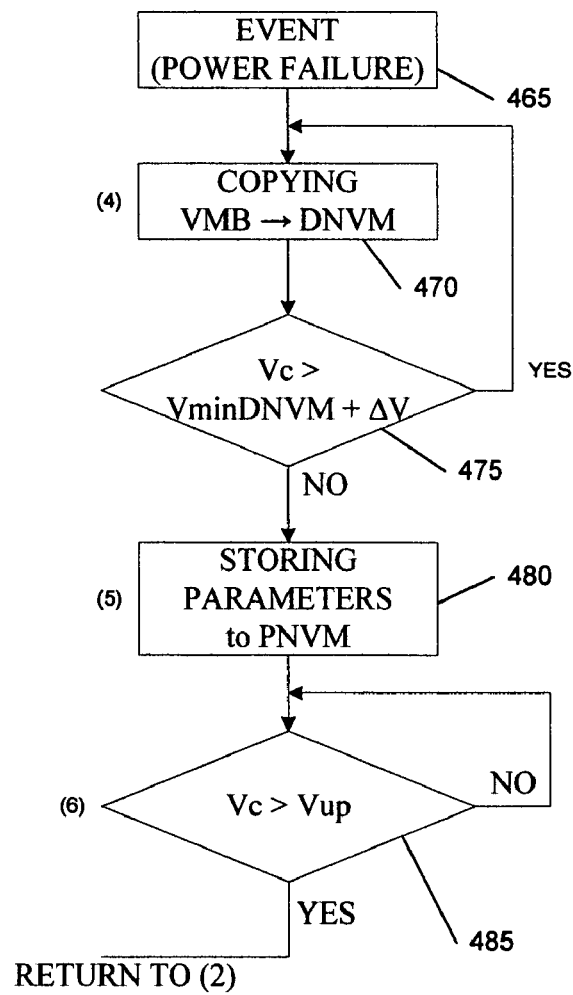

Referring now to FIG. 2a and FIG. 2b, a base part of the flowchart that illustrates an operation of the backup device 100. In these Figures it is selected three base parts: Start up, Normal operation (FIG. 2a) and Backup mode (FIG. 2b).

"Start up". The backup device 100 starts its operation after power is present at power supply input 112 of the control block 110. This is the "Power on" (410). Said backup device 100 waits for a condition when the power conversion block output voltage Vout will be more than Vdown (415). This condition is detected by the first voltage detector 180. The backup device reads parameters (for example size of the previous backup) (420) and then checks them (425).

If this size isn't equal to zero, then said backup device copies the contents of said the DNVM to said the VMB (430) (N words) and then goes to the "normal operation" mode. If this size is equal to zero, then was no backup information in the DNVM and said backup device switches directly to the "normal operation" mode.

"Normal operation". During "normal operation" mode the backup device receives information from ECA (External Computerized Apparatus) (440) and analyzes this information (445). If this information is a command then the backup device checks the type of command received. If, for example, it is "read" command (455), the backup device sends all information from the VMB to the ECA (460). If this is the data the backup device stores these data in the VMB (450).

In case when "power failure event" is detected by the first voltage detector 180 (465), the "normal mode" of operation will be interrupted and the backup device executes the interrupt and switches to the "backup mode". The backup device copies information (in full or in part, for example, N words) from the VMB to the DNVM (470). This operation will continue until the voltage drop across the capacitor 160 Vc more then VminDNVM+$\Delta$V (475) or when all information from the VMB was coped to the DNVM. The second voltage detector 190 indicates condition when Vc less or equal then VminDNVM+$\Delta$V. On the next step the backup device writes said backup parameters to the PNVM (480).

After the backup device finishes writing backup parameter to the PNVM (480) it waits for the condition when Vc>Vdown (485). If it's happened then the backup device returns from "backup mode" of operation to the "normal mode" of operation. If this condition doesn't happen and Vc becoming lower then power level necessary for the backup device operation the backup device stops its operation.

Figure 3:
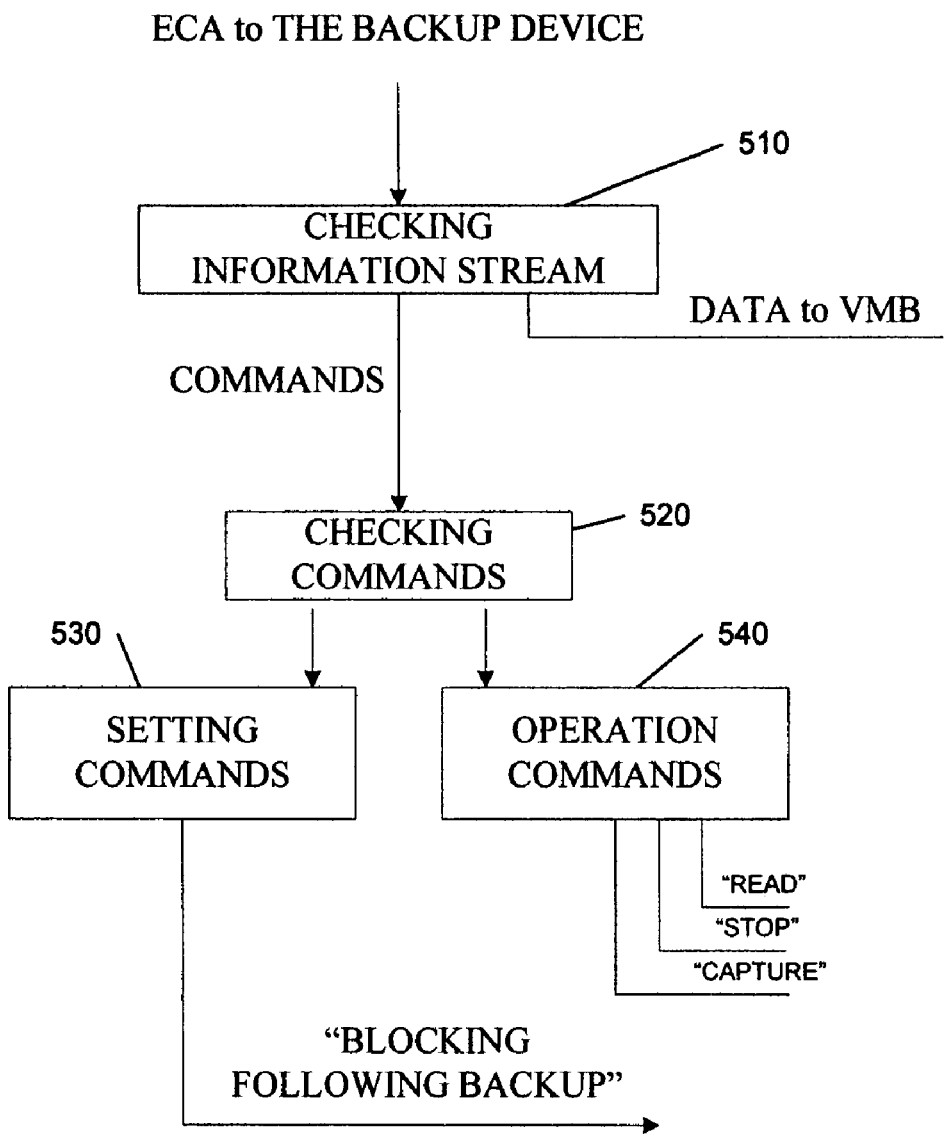
FIG. 3 is the flowchart illustrating the process of separating the information stream.

Referring now to FIG. 3 that illustrates the process dividing information stream. The incoming information stream from the ECA to the backup device is separated by a procedure (510) into two streams: a data stream and a command stream. The data stream is copied into the VMB. The command stream is separated by procedure (520) into setting command (530) and operation command (540), and these two are used for the control operation of said backup device 100. The examples of the operation commands are: (1) "read" ("read-ing data from VMB to ECA")—the backup device 100 sends said backup information from the VMB to the external interface 300; (2) "stop"—the backup device 100 stops writing the incoming data from the external interface 300 until all information is read back from VMB to the external interface 300; (3) "capture"—the backup device 300 starts to write information from the external interface 300 to the VMB from the first address up to the last address of the VMB (without overwriting), overwriting will be enabled only after the moment when information is read from VMB to the external interface 300. An example of setting commands is "blocking following backup"—this command preserves the last executed "backup" until backup information is read from the VMB to the external interface 300. Another example of a command for said backup device 100 could be the use of a dedicated command line(s) from the external interface 300 for control operations of said backup device 100.

The use of commands for controlling the operation of backup device 100 prevents previously captured data from being overwritten because of the VMB and the NVMB size limitations. These commands allow the size of the memories and internal capacitor to be reduced.

FIG. 4. illustrates the backup process. The moment 601 (point "c") corresponds to the case when the first voltage detector 180 indicates a "power failure event". In this case the voltage drop across said capacitor 160 is equal to (Vdown−Vd−Vp), where Vd is equal to the voltage drop across the element of unidirectional conductivity, for example, diode 170. If said element of unidirectional conductivity and said means for failure event detecting are connected to different outputs of the power conversion block than Vp is equal to the potential difference between ungrounded terminals of two power conversion block outputs, the first one is coupled to said means for failure event detecting, the second one is coupled to said element of unidirectional conductivity. In case when said element of unidirectional conductivity and said means for failure event detecting are connected to the common output of the power conversion block than Vp is equal to zero.

The present invention uses two embodiments: (1) the parameter array of non-volatile memory cells PNVM is integrated together with said control block 110 and the data array of non-volatile memory cells DNVM is implemented in the form of the non-volatile memory block NVMB 130, and (2) the data array of non-volatile memory cells DNVM and the parameter array of non-volatile memory cells PNVM are implemented as the non-volatile memory block NVMB 130.

Figure 4A:
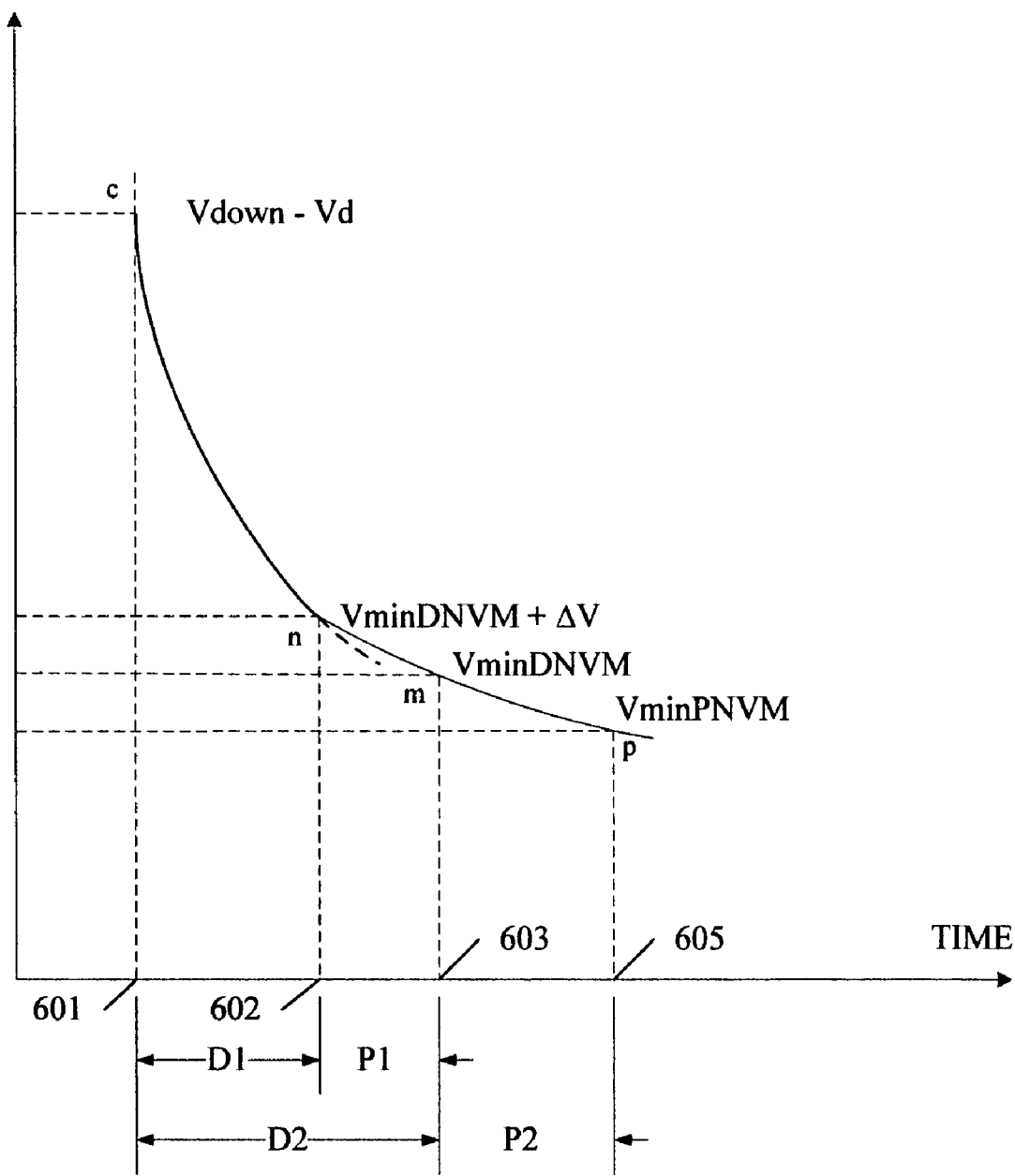
FIGS. 4a and 4b illustrate the operation of the backup device during voltage dropping.

In the case of the first embodiment FIG. 4a the curve of the capacitor discharge is the curve "c-n-m-p". During the time interval 601-602 the data has to be stored in the NVMB 130. After the time moment 602 when the second voltage detector indicates that the voltage dropped below VminDNVM+$\Delta$V (where $\Delta$V$\geq$0) the NVMB is inactive and its power consumption is negligible. During the time interval 602-605 the parameter has to be stored and the time constant for the interval 602-605 is significantly more than for the interval 601-602.

Figure 4B:
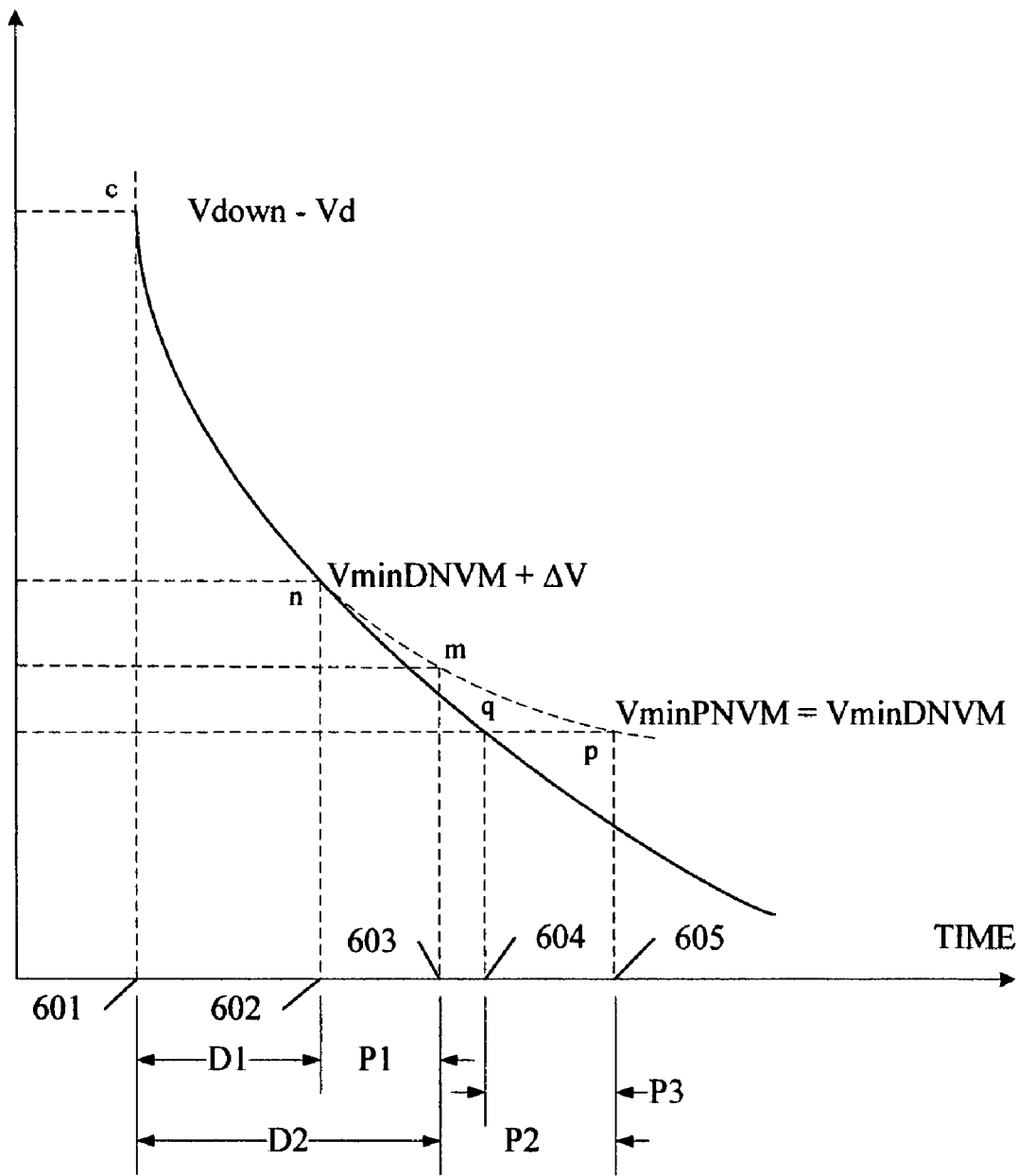

In the case of the second embodiment FIG. 4b the curve of the capacitor discharge is the curve "c-n-m-q" and VminPNVM=VminDNVM, where VminPNVM is the minimum operational voltage of the PNVM. This curve corresponds to the voltage drop across said capacitor 160 that is equal to operating voltage of said NVMB 130. During the time interval 601-602-604 two procedures must be executed: the data has to be stored from the VMB into the NVMB (interval 601-602) and the parameter has to be stored into the same NVMB (interval 602-605). The moment 602 (point "n")

is indicated by the second voltage detector when the voltage drops below VminDNVM+ΔV, where ΔV>0.

For the backup device operation the characteristics of used components must satisfy the following relations. The time interval of discharge from one voltage V1 to another V2 is equal to:

ΔT=Req*C*ln (V1/V2)}, where: Req is the equivalent average resistance of the load circuit for the capacitor 160, C is the capacitance of the capacitor 160.

In the case of the first embodiment all said characteristics must be chosen so that said time interval ΔT (602-605) for V1=VminDNVM+ΔV and V2=VminPNVM must be sufficient for storing the parameter, and ΔT(601-602) for V1=Vdown−Vd and V2=VminDNVM+ΔV must be sufficient for storing at least one unit of data.

In the case of the second embodiment all said characteristics must be chosen so that said time interval ΔT (602-604) for V1=VminDNVM+ΔV and V2=VminDNVM=VminPNVM must be sufficient for storing the parameter, and ΔT(601-602) for V1=Vdown-Vd and V2=VminDNVM+ΔV must be sufficient for storing at least one unit of data.

In the FIG. 1 one embodiment of said backup device is shown. The FIG. 5 illustrates additional possibilities of said backup device 100.

Figure 5A:
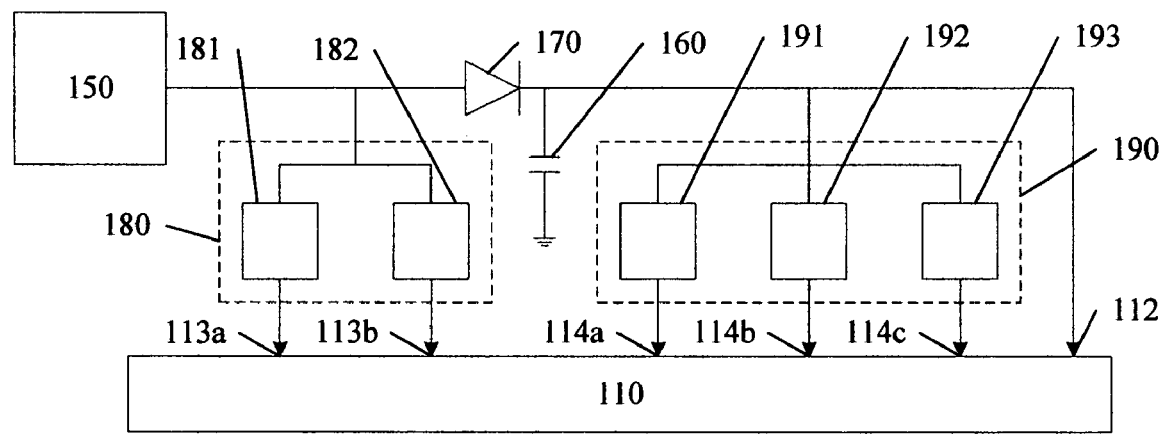
FIGS. 5a and 5b illustrate several fragments of a circuit design of the backup device.

The FIG. 5a shows that the means for "power failure event" detecting 180 and the means for backup controlling 190 may comprise more than one voltage detector (or corresponding comparator). The voltage detectors 181 and 182 may be set to the predetermined thresholds Vdown and Vup≧Vdown that enable hysteresis for complex switching. The voltage detectors 191, 192 and 193 may be set to the predetermined thresholds VminPNVM, VminDNVM and VminDNVM+ΔV correspondingly. The thresholds VminPNVM and VminDNVM allow the starting of restoring backup information from the DNVM to the VMB without waiting for the recovery of the voltage to the value Vdown. All voltage detector outputs are connected to the control inputs 113a, 113b, 114a, 114b and 114c of the control block 110 correspondingly.

Figure 5B:
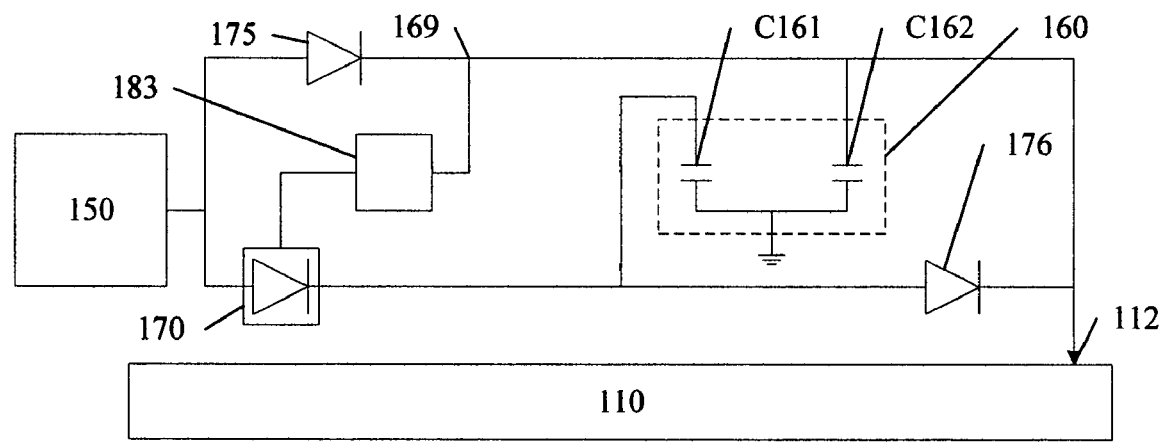

The FIG. 5b offers said accumulating block 160 comprising two capacitors C161 and C162, where the capacitance of said capacitor C162 is significantly less than the capacitance of C161. This embodiment allows the reduction of "dead zone". The capacitor C162 has enough capacitance for copying the minimal information unit and the parameter. The capacitor C161 is connected to said power conversion block 150 via controllable element of unidirectional conductivity 170 that is turned off when the capacitor C162 is not fully charged. A voltage detector 183 detects this state (C162 being fully charged) and turns on said element 170.

The incorporation of a buzzer in said backup device provides a way of the energy-independence display of this backup device state (Isn't shown).

The inclusion of a voltage multiplier in structure of the power conversion block allows to increase duration of said time intervals due to increase in the time that is necessary for the capacitor charge and to improve the time moment of said Vdown determination (Isn't shown).

We claim:

1. A smart batteryless emergency backup device, comprising:
    a control block (CB),
    a volatile random access memory block (VMB),
    a data array of non-volatile memory cells for data storing (DNVM),
    a parameter array of non-volatile memory cells for parameter storing (PNVM),
    a non-volatile memory block (NVMB), comprising at least one (DNVM) array of non-volatile memory cells,
    at least one external interface port for connection between external equipment, including external computerized apparatus, and said backup device by an external interface bus,
    an interface conversion block,
    a power conversion block,
    an electricity accumulating block, comprising at least one capacitor, one terminal of which is grounded,
    an element of unidirectional conductivity,
    means for power failure detecting having one or more outputs,
    means for backup controlling having one or more outputs;
said backup device, wherein:
    said interface and power conversion blocks are connected to one or more external interface ports,
    said control block includes one or more control inputs, a power supply input, an internal interface port that couples said interface conversion block and said control block one to another, two memory interface ports that couple said control block to said volatile memory block (VMB) and said non-volatile memory block (NVMB),
    said power conversion block outputs are coupled via said element of unidirectional conductivity to a first ungrounded terminal of said accumulating block and to a power supply input of the control block,
    one or more inputs of said means for power failure event detecting are coupled to corresponding outputs of said power conversion block,
    one or more inputs of said means for backup controlling are coupled to the ungrounded terminal of said accumulating block;
said backup device, wherein further:
    each of said means has at least one output, said outputs are coupled to corresponding inputs of said control block, said parameter array includes at least a size of information that has been written to said DNVM, said control block and said memories have minimum operating voltages that are designated as VminCB, VminVMB, VminPNVM and VminDNVM correspondingly.

2. The backup device according to claim 1, wherein: a capacitance of said accumulating block, a power consumption and minimum operating voltage of all the blocks of said backup device, including CB, VMB and NVMB, that is powered by said accumulating block, and a voltage bias ΔV are chosen to satisfy the following conditions:

(1) a time interval between the time when the power conversion block output voltage drops below said first predetermined threshold Vdown, where Vdown is chosen as an indicator of a lower boundary below which normal operation of said external computerized apparatus and said external bus(es) is disrupted,
and the time when the voltage across said accumulating block drops below the second predetermined threshold Vs=VminDNVM+ΔV, ΔV≧0 is sufficient to copy said backup information from the VMB into the DNVM, and (2) a time interval between the time when the voltage across said accumulating block drops below the second predetermined threshold and the time when said voltage drops below said fourth threshold VminPNVM is sufficient to write said parameter to the PNVM, and both said time intervals are determined with regards to possible variations in electrical characteristics.

3. The backup device according to claim 2, wherein said data array of non-volatile memory cells and said parameter array of non-volatile memory cells are implemented in the form that is chosen from the group including the following embodiments:
(a) said data array of non-volatile memory cells is implemented as separate non-volatile block NVMB, and said parameter array of non-volatile memory cells is integrated together with said control block, and said voltage values are satisfied to the following relations:

VminCB≦VminVMB≦Vs=VminDNVM+ΔV;

VminCB≦VminPNVM<Vs=VminDNVM+ΔV and (b) said data array of non-volatile memory cells and said parameter array of non-volatile memory cells are implemented together as non-volatile block NVMB, and said voltage values are satisfied to the following relations:

VminCB≦VminVMB≦Vs=VminDNVM+ΔV, and

VminCB≦VminPNVM=VminDNVM and said time intervals and said relationships are determined with regards to possible variations in electrical characteristics.

4. The backup device according to claim 2, wherein said means for power failure event detecting comprise at least one first voltage detector which detects condition when output voltage of said power conversion block falls below said first predetermined threshold Vdown;
said means for backup controlling comprises at least one second voltage detector which detects condition when voltage across said accumulating block falls below said second predetermined threshold Vs.

5. The backup device according to claim 1, wherein said accumulating block comprises a double layer capacitor.

6. The backup device according to claim 1, wherein said non-volatile array of memory cells are EEPROM cells.

7. The backup device according to claim 1, wherein one or more said external interface ports are chosen from the interface ports corresponding to the external interfaces that don't have dedicated power supply lines.

8. The backup device according to claim 1, wherein said control block comprises means for dividing information streams, that are generated by said external computerized apparatus coupled to said backup device via one or more said external interface buses, into two substreams:
(a) commands for controlling said backup device, and
(b) data that passes through said control block.

9. The backup device according to claim 1, wherein said element of unidirectional conductivity is chosen from the group including:
uncontrollable element of unidirectional conductivity implemented as a diode, and
controllable element of unidirectional conductivity with an additional controlling input,
that is coupled to an output of said control block or to the ungrounded terminals of said accumulating block.

10. The backup device according to claim 1, comprising an embedded energy-independent indicator of status of the backup device like piezoelectronic buzzer that is connected to said control block.

11. A method for backing up using the smart batteryless emergency backup device having a control block (CB) coupled to a volatile memory block (VMB), a data array of non-volatile memory cells (DNVM), and a parameter array of non-volatile memory cells (PNVM), having minimum operating voltages the same polarity and their absolute values are designated as VminCB, VminVMB, VminDNVM and Vmin PNVM correspondingly, a power conversion block and an interface conversion block coupled via an external interface port to an external computerized apparatus (ECA), an accumulating block, including at least one capacitor, and said power conversion block is connected via an element of unidirectional conductivity to said accumulating block that is coupled to said power input of said control block and via said control block to power inputs of NVMB, comprising at least said DNVM, and said VMB;
said method, comprising four parallel processes:
(A) monitoring a voltage drop across an output of the power conversion block for detecting at least the time of a power failure event when said voltage drops below a first predetermined threshold Vdown that is chosen as an indicator of a lower boundary below which normal operation of said external computerized apparatus and said external bus(es) is disrupted,
(B) recharging the electricity accumulating block when the voltage across power conversion block output that is connected to said element of unidirectional conductivity ((that)) is greater than the sum of Vd and the voltage across said accumulating block, where Vd is the voltage drop across said element of unidirectional conductivity, and discharging of the electricity accumulating block the rest of the time,
(C) monitoring a voltage drop across said accumulating block for detecting at least the time when said voltage drops below a second predetermined threshold Vs,
(D) backup processing; and
said method, wherein said backup processing comprises the following procedures:
(1) power on and waiting the following condition when the voltage drop across an output of the power conversion block will be greater than the first predetermined threshold Vdown and the voltage drop across said accumulating block will be greater than the second predetermined threshold Vs,
(2) receiving information stream from said external computerized apparatus (ECA) via said external interface port,
(3) storing said information in said volatile memory block (VMB) according to a cyclic access mode,
(4) copying at least a part of the contents of said VMB to said data array of non-volatile memory cells (DNVM) in reverse sequence when the latest stored data are copied first together with simultaneous calculating of the size (N) of this written information,
(5) storing the calculated size (N) as the part of the parameter array into said parameter array of non-volatile memory cells (PNVM),
(6) waiting the following condition when the voltage drop across an output of the power conversion block will be greater than the first predetermined threshold Vdown and the voltage drop across said accumulating block will be greater than the second predetermined threshold Vs,
(7) reads said parameter array from said PNVM, and this parameter array includes at least the size of information that has already been written into said DNVM, and compares said size (N) value with zero,
(8) copying information from said DNVM to said VMB; said method comprising further:
terminating said procedure (4) by the event that occurs first from the following events:
dropping said voltage across said accumulating block below said predetermined threshold Vs, or
completing write of all contents of VMB to DNVM.

12. The method according to claim 11, wherein said Vs is equal to VminDNVM+ΔV, said VminCB, VminVMB, VminDNVM and VminPNVM, the first predetermined threshold Vdown, an additional voltage bias ΔV, a power consumption of all the blocks of said backup device, that are powered by said accumulating block, and capacitance of said accumulating block are chosen so that:

(a) a first time interval between the time when the power conversion block output voltage drops below said first predetermined threshold Vdown and the time when the voltage across said accumulating block drops below the second predetermined threshold Vs is sufficient to copy at least a part of the contents of said VMB to said DNVM, and this first interval corresponds to said procedure (4), (aa) a second time interval between the time when the voltage across said accumulating block drops below the second predetermined threshold Vs and the time when said voltage drops below said value VminPNVM is sufficient to write said parameter array to said PNVM, and this second interval corresponds to said procedure (5);

said method, wherein said minimal operating voltages are ordered so that they satisfy the following relationships:

VminVMB≦Vs, VminCB≦VminPNVM<Vs, VminPNVM≦VminDNVM+ΔV, and said time intervals and said relationships are determined with regards to possible electrical characteristics variations.

13. The method according to claim 11, wherein the condition for switching:

(b) from said procedure (1) to said procedure (7) and
(bb) from said procedure (6) to said procedure (2), is
such condition when the voltage drop across an output of the power conversion block will be greater than the first predetermined threshold Vdown and the voltage drop across said accumulating block will be greater than the second predetermined threshold Vs.

14. The method according to claim 11, wherein the following conditions for switching from one procedure to another are:

(i) from (4) to (5)—after terminating said procedure (4),
(ii) from (5) to (6)—after finishing (5),
(iii) from (7) to (2)—automatically after finishing (7) if N=0,
(iv) from (7) to (8)—automatically after finishing (7) if N>0,
(v) from (8) to (2)—automatically after finishing (8).

15. The method according to claim 11, wherein dropping the voltage across said accumulating block below the first predetermined threshold Vdown interrupts the current procedure and starts the procedure (4).

16. The method according to claim 11, wherein said method comprises between procedure (2) and (3) includes additional procedure (9), said procedure (9) includes:

dividing said information stream into two parts: (b) commands for controlling said backup device and (bb) data that passes through the control block,
decoding said commands in case that information stream includes command;
in case there is no command in said information stream, said method switches from said procedure (9) to said procedure (3);
in case that said information stream includes command, said method executes said command and switches after from said procedure (9) to said procedure (2).

17. The method according to claim 16, wherein a collection of supported commands includes the following groups:

(c) operation commands that are executed once,
(cc) setting commands that define said backup device operation.

18. The method according to claim 17, wherein said group of operation commands comprises the following procedures:

(d) blocking writing received information from said external computerized apparatus to said VMB until a dedicated command is received,
(dd) cleaning said VMB and blocking cycled overwrite to the VMB until receiving a dedicated command,
(ddd) reading data from said VMB to the ECA.

19. The method according to claim 17, wherein said group of setting commands comprises the following procedure:

e) blocking the next operation of copying any data to said data array of non-volatile memory cells (DNVM) and to said parameter array of non-volatile memory cells (PNVM).

* * * * *